(12) United States Patent
Ziech

(10) Patent No.: US 11,460,096 B2
(45) Date of Patent: Oct. 4, 2022

(54) SINGLE ELECTRIC MOTOR DRIVE AXLE WITH MULTIPLE RATIOS

(71) Applicant: Dana Heavy Vehicle Systems Group, LLC, Maumee, OH (US)

(72) Inventor: James F. Ziech, Kalamazoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/342,369

(22) Filed: Jun. 8, 2021

(65) Prior Publication Data

US 2021/0293314 A1    Sep. 23, 2021

Related U.S. Application Data

(63) Continuation of application No. 16/088,193, filed as application No. PCT/US2017/024299 on Mar. 27, 2017, now Pat. No. 11,054,009.

(Continued)

(51) Int. Cl.
*F16H 37/08* (2006.01)
*B60B 35/12* (2006.01)

(Continued)

(52) U.S. Cl.
CPC ......... *F16H 37/082* (2013.01); *B60B 35/125* (2013.01); *B60K 1/00* (2013.01); *B60K 6/26* (2013.01); *B60K 6/365* (2013.01); *B60K 17/02* (2013.01); *B60K 17/046* (2013.01); *B60K 17/165* (2013.01); *F16H 3/54* (2013.01); *H02K 7/006* (2013.01); *H02K 7/108* (2013.01); *H02K 7/116* (2013.01); *B60K 2001/001* (2013.01); *B60Y 2200/91* (2013.01);

*B60Y 2200/92* (2013.01); *B60Y 2400/73* (2013.01); *F16D 11/00* (2013.01); *F16H 2200/0021* (2013.01);

(Continued)

(58) Field of Classification Search
None
See application file for complete search history.

(56) References Cited

U.S. PATENT DOCUMENTS

| 1,117,700 A | 11/1914 | Piggins |
| 1,258,946 A | 3/1918 | Russel |

(Continued)

FOREIGN PATENT DOCUMENTS

| CN | 101544178 A | 9/2009 |
| CN | 102741079 A | 10/2012 |

(Continued)

OTHER PUBLICATIONS

ISA European Patent Office, International Search Report and Written Opinion Issued in Application No. PCT/US2017/024299, dated Jul. 28, 2017, WIPO, 12 pages.

(Continued)

*Primary Examiner* — Leslie A Nicholson, III
(74) *Attorney, Agent, or Firm* — McCoy Russell LLP

(57) ABSTRACT

An electric drive axle for a motor vehicle including an axle housing, an electric motor having an output shaft directly driven by a bevel pinion gear coupled thereto, a fixed ratio planetary gear arrangement, a differential unit including a differential gear arrangement housed within a differential case and a first clutch selectively operable to connect a portion of the planetary gear set to a stationary member of the drive axle so that the drive axle operates in a first gear ratio.

18 Claims, 6 Drawing Sheets

Related U.S. Application Data

(60) Provisional application No. 62/314,023, filed on Mar. 28, 2016.

(51) Int. Cl.

| | | |
|---|---|---|
| *B60K 1/00* | (2006.01) | |
| *B60K 6/26* | (2007.10) | |
| *B60K 6/365* | (2007.10) | |
| *B60K 17/02* | (2006.01) | |
| *B60K 17/04* | (2006.01) | |
| *B60K 17/16* | (2006.01) | |
| *F16H 3/54* | (2006.01) | |
| *H02K 7/00* | (2006.01) | |
| *H02K 7/108* | (2006.01) | |
| *H02K 7/116* | (2006.01) | |
| *F16D 11/00* | (2006.01) | |

(52) U.S. Cl.
CPC ........... *F16H 2200/0034* (2013.01); *F16H 2200/2005* (2013.01); *F16H 2200/2064* (2013.01); *F16H 2200/2094* (2013.01)

(56) References Cited

U.S. PATENT DOCUMENTS

| | | | |
|---|---|---|---|
| 1,373,142 | A | 3/1921 | Midboe |
| 1,421,836 | A | 7/1922 | Russel |
| 2,689,015 | A | 9/1954 | Nallinger |
| 3,799,284 | A | 3/1974 | Hender |
| 4,270,622 | A | 6/1981 | Travis |
| 5,168,946 | A | 12/1992 | Dorgan |
| 5,188,195 | A | 2/1993 | Haustein |
| 5,718,300 | A | 2/1998 | Frost |
| 5,845,731 | A | 12/1998 | Buglione et al. |
| 6,295,847 | B1 | 10/2001 | Zeren |
| 6,644,427 | B2 | 11/2003 | Schulte |
| 6,740,002 | B1 | 5/2004 | Stridsberg |
| 6,953,408 | B2 | 10/2005 | Thompson |
| 7,028,583 | B2 | 4/2006 | Bennett |
| 7,174,978 | B2 | 2/2007 | Taniguchi et al. |
| 7,255,187 | B2 | 8/2007 | Bell et al. |
| 7,410,017 | B2 | 8/2008 | Gradu |
| 7,497,286 | B2 | 3/2009 | Keller et al. |
| 7,520,534 | B2 | 4/2009 | Longchamp |
| 7,742,852 | B1 | 6/2010 | Tang |
| 7,866,423 | B2 | 1/2011 | Ruppert et al. |
| 7,959,534 | B2 | 6/2011 | Kasuga et al. |
| 3,011,461 | A1 | 9/2011 | Rodriguez et al. |
| 8,944,194 | B2 | 2/2015 | Glaser et al. |
| 8,992,366 | B2 | 3/2015 | Gassmann |
| 9,039,559 | B2 | 5/2015 | Gassmann |
| 9,062,744 | B2 | 6/2015 | Valente et al. |
| 9,139,079 | B2 | 9/2015 | Suntharalingam et al. |
| 9,162,586 | B2 | 10/2015 | Tang |
| 9,242,547 | B2 | 1/2016 | Dzafic et al. |
| 9,505,304 | B1 | 11/2016 | McCoy et al. |
| 9,593,754 | B2 | 3/2017 | Sten |
| 9,637,127 | B1 | 5/2017 | Cooper |
| 2003/0111280 | A1 | 6/2003 | Platner et al. |
| 2003/0205422 | A1 | 11/2003 | Morrow et al. |
| 2004/0050597 | A1 | 3/2004 | Ai et al. |
| 2005/0109549 | A1 | 5/2005 | Morrow |
| 2007/0038340 | A1 | 2/2007 | Sekiguchi et al. |
| 2009/0205422 | A1 | 8/2009 | Caron et al. |
| 2009/0242289 | A1 | 10/2009 | Murty |
| 2009/0321153 | A1 | 12/2009 | Boeckenhoff et al. |
| 2010/0282530 | A1 | 11/2010 | Wang et al. |
| 2011/0120788 | A1 | 5/2011 | Wang et al. |
| 2011/0259657 | A1 | 10/2011 | Fuechtner |
| 2013/0150197 | A1 | 6/2013 | Lee et al. |
| 2014/0116793 | A1 | 5/2014 | Pelletier et al. |
| 2015/0211616 | A1 | 7/2015 | Yang et al. |
| 2016/0091059 | A1 | 3/2016 | Boulet et al. |

FOREIGN PATENT DOCUMENTS

| | | |
|---|---|---|
| CN | 202573795 U | 12/2012 |
| DE | 102005062874 A1 | 7/2007 |
| DE | 102014103485 A1 | 9/2014 |
| EP | 1232892 A2 | 8/2002 |
| EP | 2574490 A2 | 4/2013 |
| EP | 2574491 A1 | 4/2013 |
| EP | 2705968 A1 | 3/2014 |
| EP | 2902234 A1 | 8/2015 |
| EP | 2927036 A1 | 10/2015 |
| FR | 2746352 A1 | 9/1997 |
| FR | 2864191 A1 | 6/2005 |
| KR | 20120117518 A | 10/2012 |
| WO | 2005081930 A2 | 9/2005 |
| WO | 2007131849 A1 | 11/2007 |
| WO | 2012007030 A1 | 1/2012 |
| WO | 2012007031 A1 | 1/2012 |

OTHER PUBLICATIONS

China National Intellectual Property Administration, Office Action and Search Report Issued in Application No. 201780019124.6, dated Oct. 30, 2020, 10 pages.

PLANETARY LEVER DIAGRAM

SINGLE ELECTRIC MOTOR DRIVE AXLE WITH MULTIPLE RATIOS

CROSS-REFERENCE TO RELATED APPLICATIONS

The present application is a continuation of U.S. patent application Ser. No. 16/088,193, entitled "SINGLE ELECTRIC MOTOR DRIVE AXLE WITH MULTIPLE RATIOS," and filed on Sep. 25, 2018. U.S. patent application Ser. No. 16/088,193 is a national phase of International Patent Application No. PCT/US2017/024299, entitled "SINGLE ELECTRIC MOTOR DRIVE AXLE WITH MULTIPLE RATIOS," and filed on Mar. 27, 2017. International Patent Application No. PCT/US2017/024299 claims priority to U.S. Provisional Patent Application No. 62/314,023, entitled "SINGLE ELECTRIC MOTOR DRIVE AXLE WITH MULTIPLE RATIOS," and filed on Mar. 28, 2016. The entire contents of each of the above-listed applications are hereby incorporated by reference for all purposes.

BACKGROUND

Provided herein is an electric drive axle for a motor vehicle and, more particularly, an electric drive axle having a single electric motor that provides two and three speed configurations.

There is an increasing interest in hybrid and electric vehicles to reduce carbon emission and reduce air pollution. Current technology for electrified motors used in motor vehicles have a limited spread in torque and speed. The use of electric motors drivetrains can be optimized to efficiently deliver high torque at low speeds and low torque at high speeds, but not both.

Current designs for electric drive axles optimize performance by adding additional components to the drivetrains such as additional motors, a multi-speed gearbox between the motor and axle, and a hub reduction to achieve a desired overall axle ratio and performance. However, these designs entail adding cost and complexity to the drivetrains.

Therefore, it would be advantageous to develop an electric drive axle for an electric vehicle that can operate efficiently at both high and low speeds that is cost effect and simple to control.

SUMMARY

Provided herein is an electric drive axle for a motor vehicle including an axle housing, an electric motor having an output shaft directly driven by a bevel pinion gear coupled thereto, a fixed ratio planetary gear arrangement, a differential unit and a first clutch. The fixed ratio planetary gear arrangement includes a sun gear, a ring gear, and a carrier connecting the sun gear and ring gear. The differential unit includes a differential gear arrangement housed within a differential case. The first clutch is selectively operable to connect the sun gear to a stationary member of the drive axle. Further, the ring gear is drivingly connected to the bevel pinion gear and the carrier is in driving engagement with the differential case.

Provided herein an electric drive axle for a motor vehicle including an axle housing, an electric motor having an output shaft directly driven by a bevel pinion gear coupled thereto, a fixed ratio planetary gear arrangement, a differential unit and a first clutch. The fixed ratio planetary gear arrangement includes a sun gear, a ring gear, and a carrier connecting the sun gear and ring gear. The differential unit includes a differential gear arrangement housed within a differential case. The first clutch is selectively operable to connect the ring gear to a stationary member of the electric axle. Further, the sun gear is drivingly connected to the bevel pinion gear and the carrier is in driving engagement with the differential case.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments. Hence, specific dimensions, directions, orientations or other physical characteristics relating to the embodiments disclosed are not to be considered as limiting, unless expressly stated otherwise.

Figure 1:
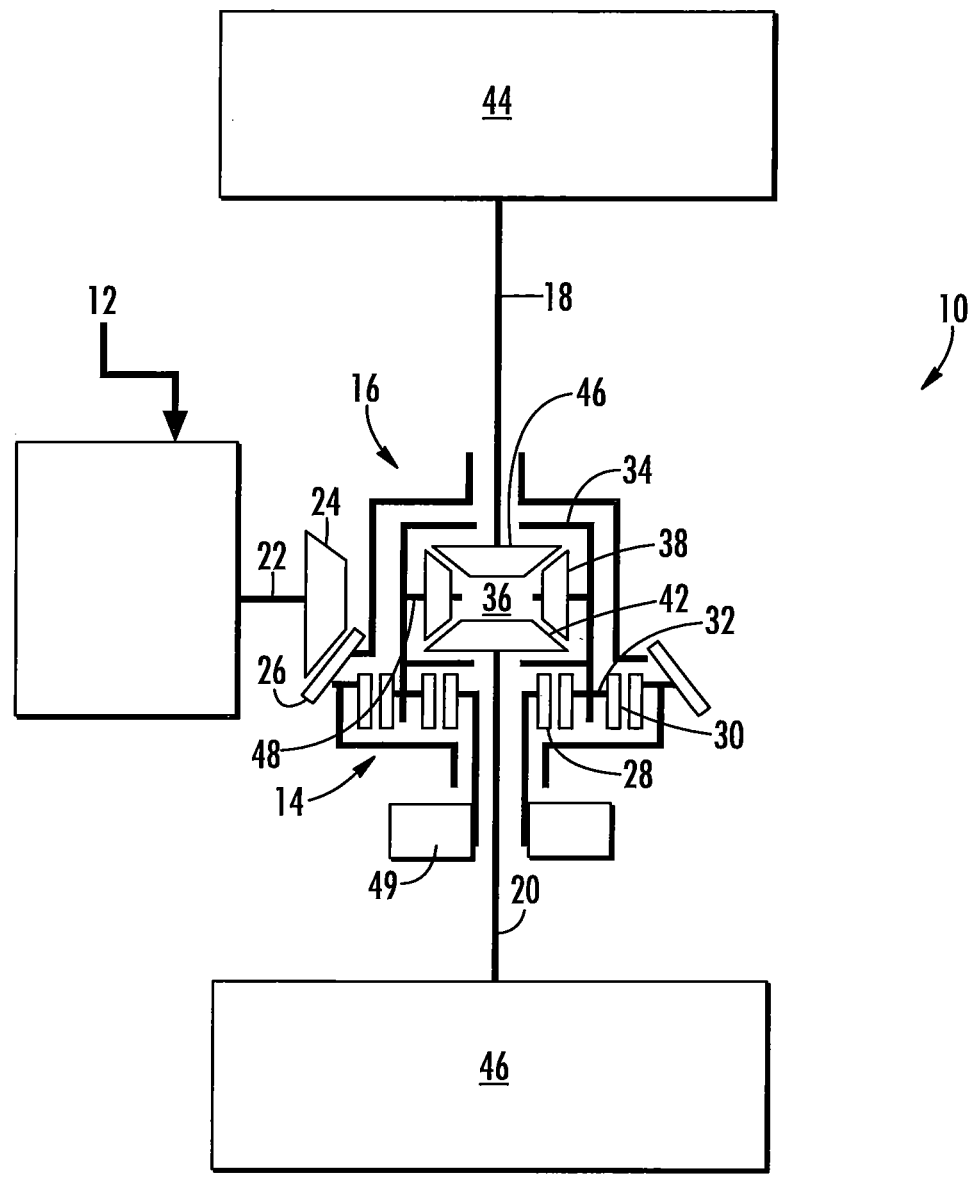
FIG. 1 is a schematic view of an electric drive axle according to a preferred embodiment.

FIG. 1 is a schematic view of an electric drive axle 10 for a motor vehicle according to a preferred embodiment. The electric drive axle 10 includes a motor-generator 12, a reducing planetary gear set 14, a differential unit 16 and two axle half shafts 18, 20. As is depicted the electric drive axle 10 includes the five assembles 12, 14, 16, 18, 20, but is understood that the axle 10 may include fewer or more assemblies.

The motor-generator 12 is coupled to an axle housing (not shown). The motor-generator 12 is in electrical communication with a controller (not shown) and an energy storage device (not shown). In some embodiments, the energy storage device can be a battery. Depending on the electrical control of the motor-generator 12 using the controller, the motor-generator 12 may apply force to or retard a portion of the electric drive axle 10 it is drivingly engaged with. In some embodiments, the motor-generator 12 is positioned within an axle housing. It is to be understood that the battery can be replaced with a fuel cell for a fuel cell electric vehicle drivetrain (FCEV).

As shown in FIG. 1, the motor-generator 12 is arranged transversely to axle half shafts 18, 20 of the motor vehicle and directly drives an output shaft 22. The output shaft 22 is drivingly connected to a bevel pinion 24. Alternately, the bevel pinion 24 may be integrally formed with the output shaft 22. The bevel pinion 24 meshes with a bevel gear 26 drivingly engaged with the reducing planetary gear set 14. The bevel gear 26 may be one of a hypoid gear, a spiral bevel gear, a straight bevel gear, or any other gear known to those skilled in the art. In one embodiment, the bevel pinion 24 and bevel gear 26 can provide a gear ratio of 6.5:1, but is not limited thereto.

The bevel gear 26 is drivingly engaged with the planetary gear set 14. In one embodiment, the planetary gear set 14 is integrated into the electric drive axle 10 and positioned between the bevel gear 26 and the axle half shafts 18, 20. In some embodiments, the planetary gear set 14 is a fixed ratio planetary gear set. The planetary gear set 14 is drivingly engaged with the bevel gear 26 and the differential unit 16. The planetary gear set 14 includes a sun gear portion 28, a ring gear portion 30 and a carrier portion 32 connecting the sun gear portion 28 and the ring gear portion 30.

In further embodiments, the planetary gear set 14 can include additional reducing gear sets to achieve a desired gear reduction depending on the application the electric drive axle 10 is used.

As shown in FIG. 1, the ring gear portion 30 is in driving engagement with the motor-generator 12 via the bevel gear 26. The carrier portion 32 is in driving engagement with a differential case 34 including a differential gear arrangement 36 of the differential unit 16.

In some embodiments, the differential gear arrangement 36 includes a pair of pinion gears 38 and side gears 40, 42 rotatably supported in the differential case 34. However, other differential gear arrangements including, but not limited to, a planetary differential gear arrangements can also be used. The differential case 34 rotates around a rotational axis Z along with the two axle half shafts 18, 20 which are supported coaxially to the rotational axis Z. The side gears 40, 42 mesh with the pinion gears 38 and engage axle half shafts 18, 20 respectively. The output axle half shafts 18, 20 lead to wheel assemblies 44, 46. The pinion gears 38 are rotatably supported on a pinion shaft 48 secured to the differential case 34. The wheel assemblies 44, 46 include left and right wheels 44*a*, 46*a* respectively that are powered by the electric drive axle 10.

The sun gear portion 28 is permanently grounded to a stationary member 49 of the motor vehicle resulting in the planetary gear set 14 producing a reducing planetary fixed planetary gear ratio. In some embodiments, the stationary member 49 is an axle housing, but is not limited thereto. In one embodiment, the stationary member 49 is positioned between the planetary gear set 14 and the wheel assembly 46. As a non-limiting example, the planetary gear set may have a gear ratio of 1.4:1. However, it is understood that other reducing gear ratios are possible. It is understood that the planetary gear set 14 may have other configurations that facilitate a similar operation and the position of the stationary member 49 can vary depending on the arrangement of the planetary gear set 14. The fixed planetary gear ration provided by the planetary gear set 14 allows for the size of the electric motor 12 to be reduced.

Figure 2:
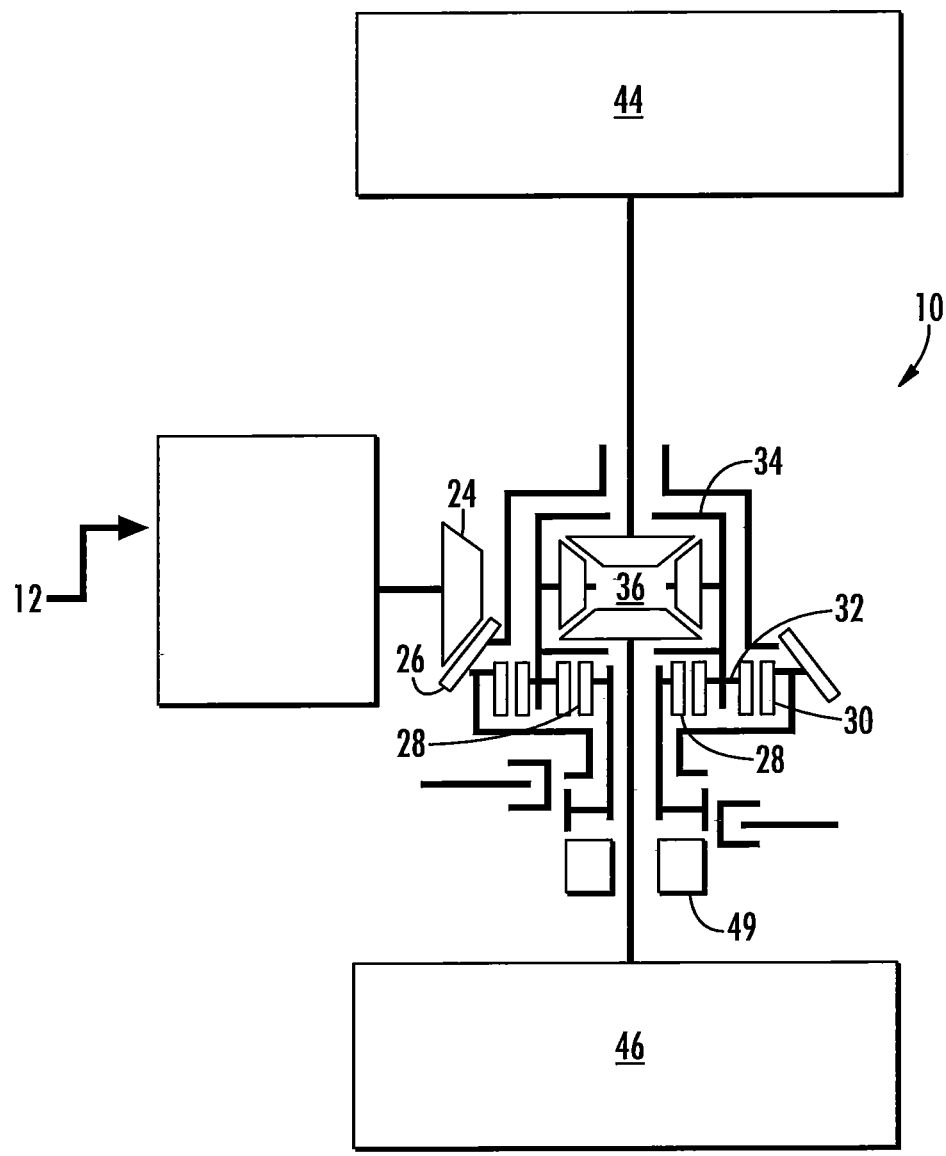
FIG. 2 is a schematic view of an electric drive axle according to another preferred embodiment.

Additionally, as shown in FIG. 2, in another preferred embodiment, the electric drive axle 10 can include a clutch 50 which selectively grounds the sun gear portion 28 to the stationary member 49 providing a two-speed electric drive axle. When the sun gear portion 28 is grounded, the electric drive axle 10 provides a first planetary gear ratio and when the sun gear portion 28 is not grounded, the electric drive axle 10 provides a second planetary gear ratio or a direct drive ratio. In one embodiment, the first planetary gear ratio is 1.4:1, but is not limited thereto. It is understood that the planetary gear set 14 may have other configurations that facilitate a similar operation and the position of the stationary member 49 can vary depending on the arrangement of the planetary gear set 14.

As shown in FIG. 2, the clutch 50 is a dog clutch; however, other torque transmitting devices can be used. In some embodiments, the clutch 50 is in communication with an actuator. The actuator can be, but is not limited to, an electromagnetic actuator a pneumatic actuator. The actuator can be controller by the controller and/or a supervisory vehicle control system (SVC).

In some embodiments, the motor-generator 12, bevel gears 24, 26, planetary gear set 14 and differential unit 36 are integrated into a single unit on the axle of the motor vehicle providing a minimal packaging envelope that is easily adaptable to existing motor vehicle chassis and suspension systems.

Figure 3:
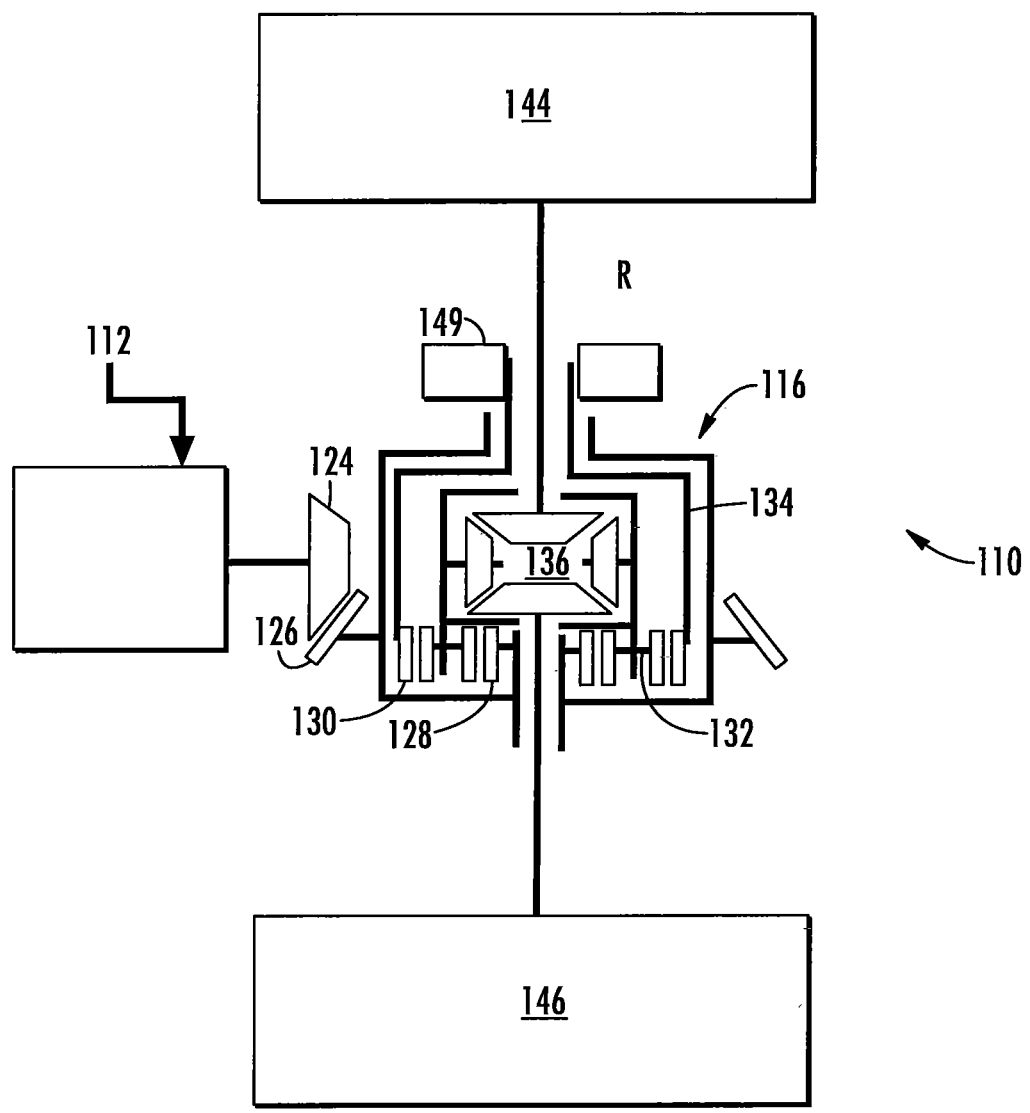
FIG. 3 is a schematic view of an electric drive axle according to another preferred embodiment.
Figure 4:
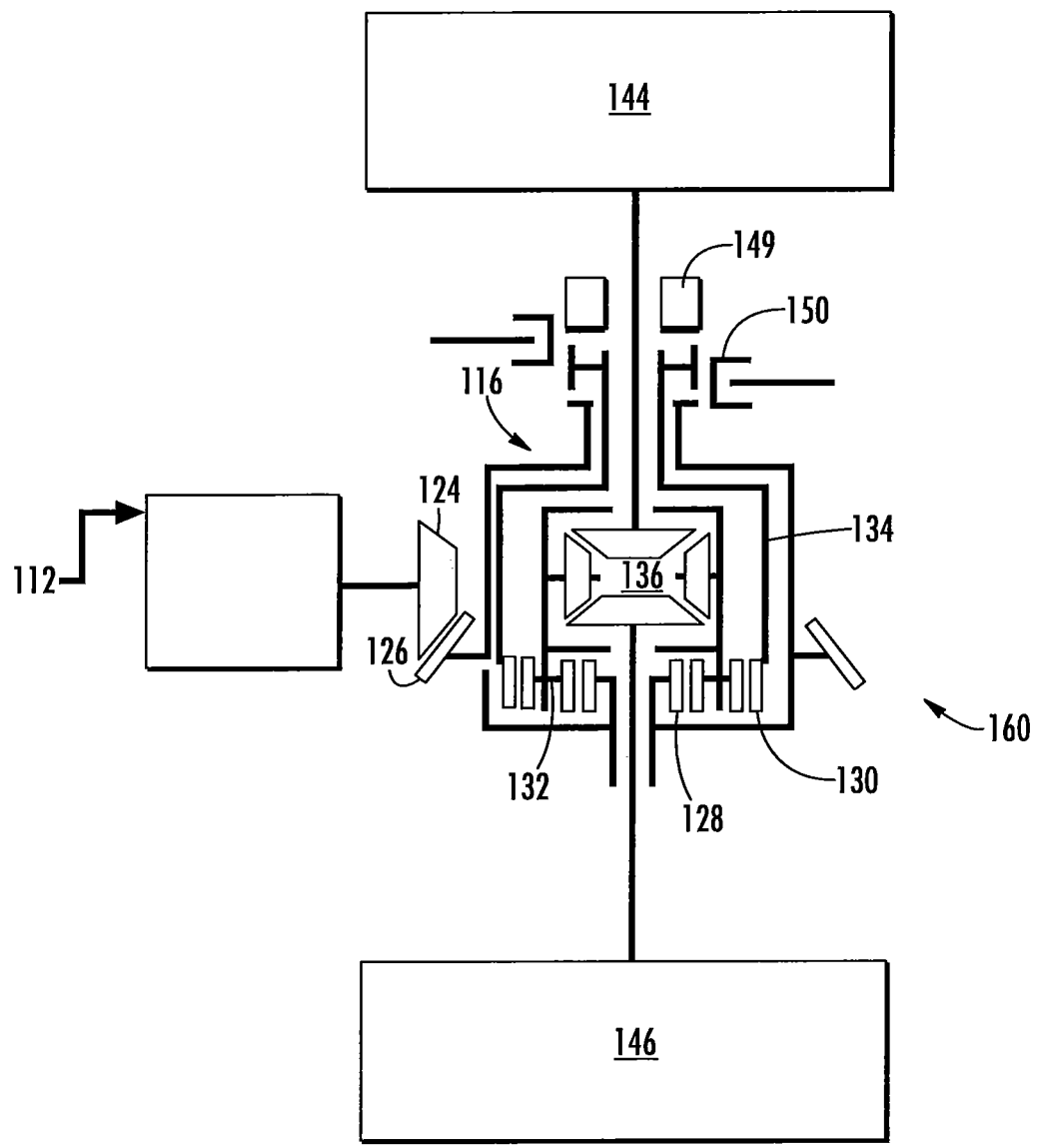
FIG. 4 is a schematic view of an electric drive axle according to another preferred embodiment.
Figure 5:
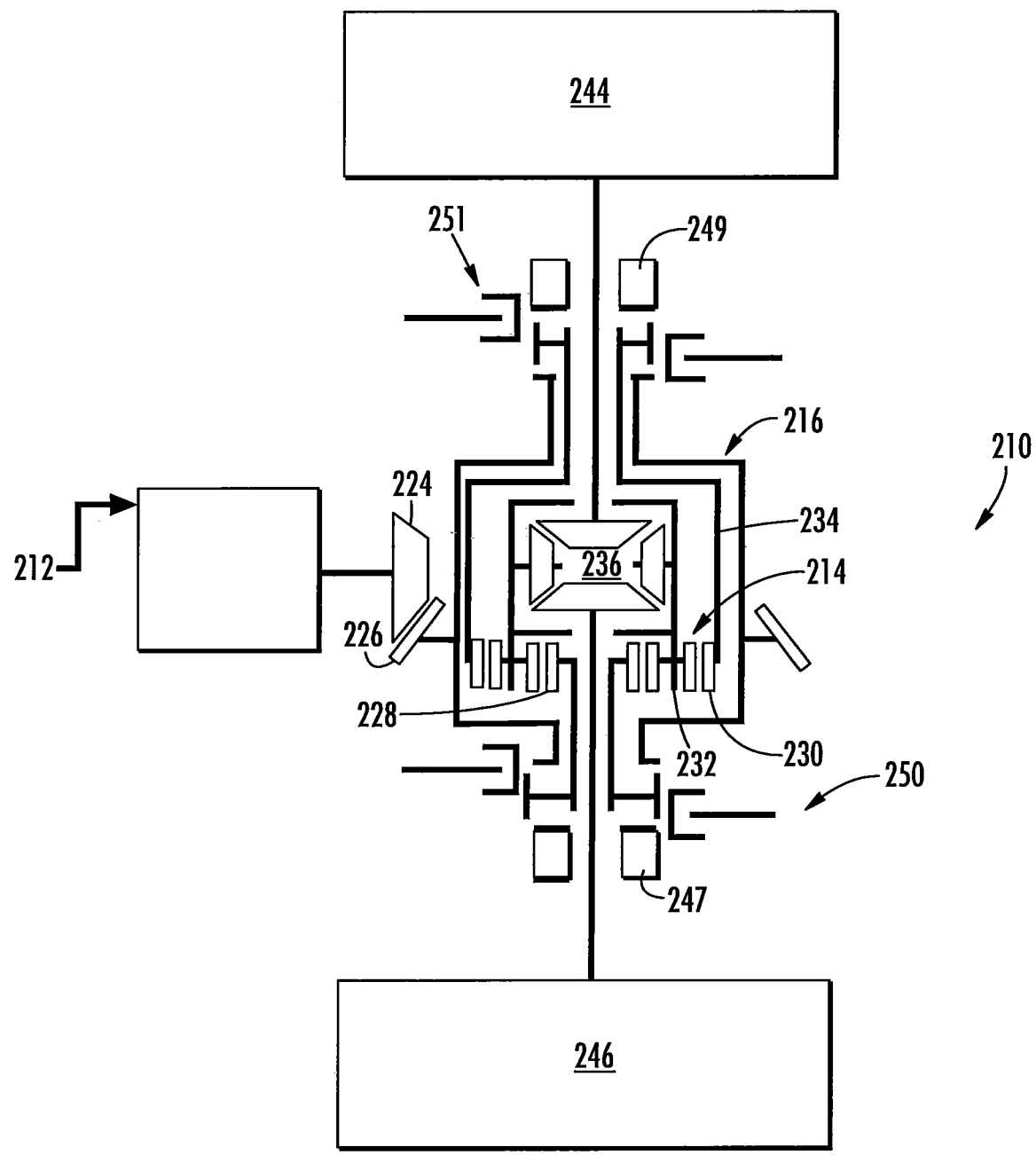
FIG. 5 is a schematic view of an electric drive axle according to another preferred embodiment.

FIGS. 3-6 illustrate an electric drive axle according to other preferred embodiments. The electric drive axles are variations of the electric drive axle 10 and have similar features thereto. The embodiments shown in FIGS. 3-5 include similar components to the electric drive axle 10. Similar features of the embodiment shown in FIGS. 3-5 are numbered similarly in series. Different and additional features of the variation shown in FIGS. 3-5 are described hereinbelow and can be appreciated by one skilled in the art in view of FIG. 1 and the other embodiments illustrated and described in this disclosure.

In another preferred embodiment, as shown in FIG. 3, the sun gear portion 128 of planetary gear set 114 of the electric drive axle 110 is drivingly engaged with the motor-generator 112 via the bevel pinion 124 and the bevel gear 126. The bevel pinion 124 and bevel gear 126 can have a 5:1 bevel gear ratio, but is not limited thereto. The carrier portion 132 of planetary gear set 114 is in driving engagement with a portion of the differential housing 134 including the differential gear arrangement 136. In this arrangement, the ring gear portion 130 is permanently grounded to a stationary member 149 to produce a fixed planetary gear ratio. In one embodiment, the stationary member 149 is positioned between the differential unit 116 and the wheel assembly 144. As a non-limiting example, the fixed planetary gear ratio may be 4:1. It is understood that the planetary gear set 114 may have other configurations that facilitate a similar operation and the position of the stationary member 149 can vary depending on the arrangement of the planetary gear set 114.

In another preferred embodiment, as shown in FIG. 4, a clutch 150 can be included in the electric drive axle 110. The clutch 150 may be selectively engaged to ground the ring portion 130, providing a two-speed electric drive axle. When the ring gear portion 130 is grounded, the electric drive axle 110 provides a first planetary gear ratio and when the ring gear portion 130 is not grounded, the electric drive axle 110 provides a second planetary gear ratio or a direct drive ratio. As a non-limiting example, the first planetary gear ratio may be 4:1. In one embodiment, as shown in FIG. 4, the clutch 150 is a dog clutch; however, other torque transmitting devices can be used.

In another preferred embodiment, as shown in FIG. 5, both the ring gear portion 230 and the sun gear portion 228 of the planetary gear set 214 can be selectively grounded using clutches 250, 251 respectively providing a three-speed option providing three modes of operation, depending on the position of the clutches 250, 251.

In this embodiment, the sun gear portion 228 is selectively coupled to the bevel gear 226 or grounded to a stationary member 247 by a first clutch 250. In one embodiment, the stationary member 247 is positioned between the planetary gear set 214 and the wheel assembly 246. The ring gear portion 230 is also selectively grounded or coupled to a stationary member 249 by a second clutch 251. In one embodiment, the stationary member 249 is positioned between the differential unit 216 and the wheel assembly 244. Both the sun gear portion 228 and the ring gear 230 can be selectively grounded by clutches 250, 251 respectively. In a further embodiment, as shown in FIG. 5, the clutches 250, 251 are dog clutches; however, other torque transmitting devices can be used. It is understood that the planetary gear set 214 may have other configurations that facilitate a similar operation and the position of the stationary members 247, 249 can vary depending on the arrangement of the planetary gear set 214.

Figure 6:
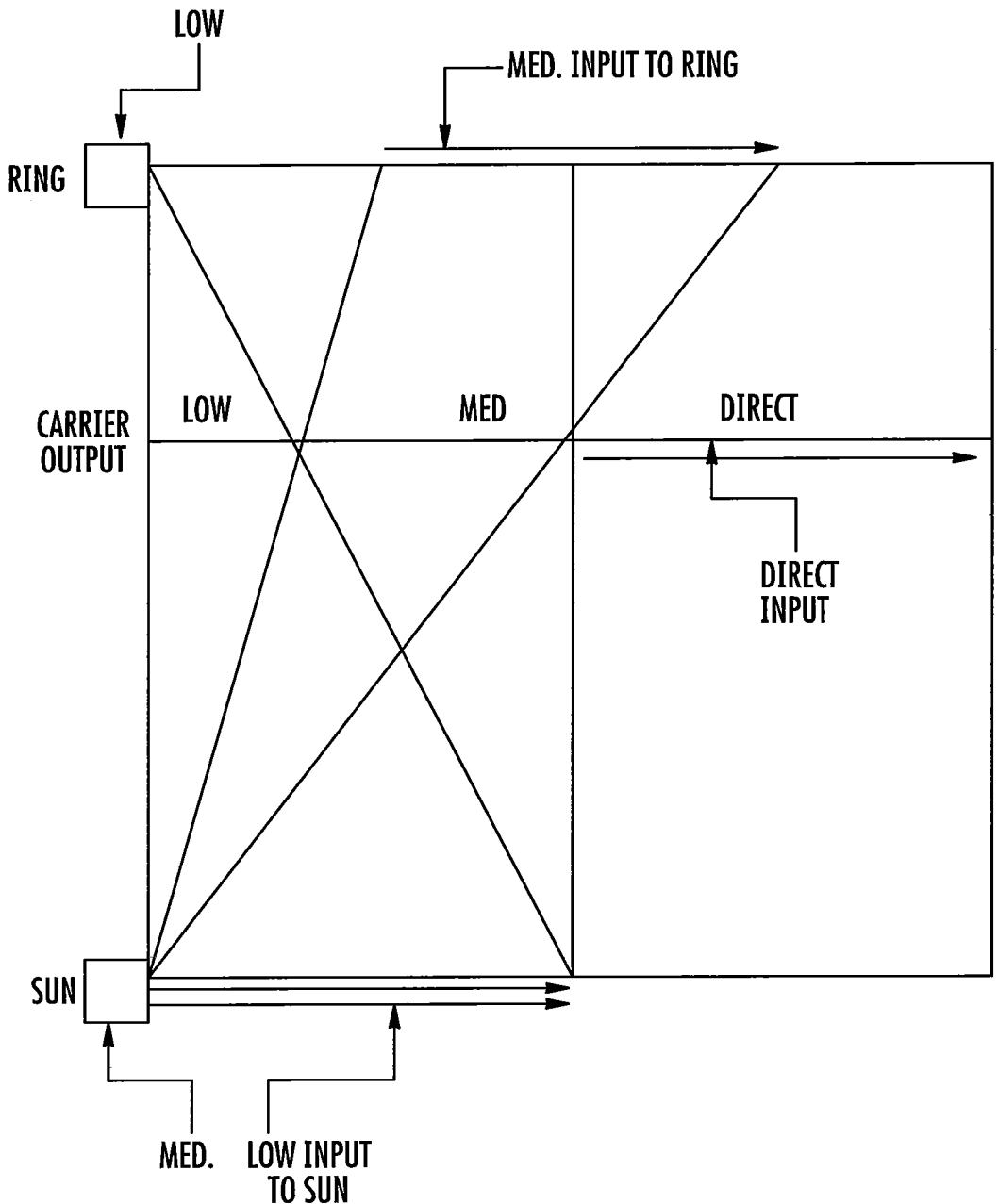
FIG. 6 is a level diagram of a planetary gear set of the electric drive axle depicted in FIG. 5.

In one embodiment, the bevel ratio gear ratio is 5:1; however, it is not limited thereto. When the sun gear portion 228 only is selectively grounded, a first planetary gear ratio is provided. In one embodiment, the first planetary gear ratio is 1.4:1. When the ring gear portion 230 only is selectively grounded, a second planetary gear ratio is provided. In one embodiment, the second planetary gear ratio is 4:1. When neither the ring gear portion 230 nor the sun gear portion 228 is grounded, the electric drive axle 210 is a direct drive mode, i.e. a 1:1 planetary gear ratio. The lever diagram, as shown in FIG. 6, represents the planetary gear set 214 arrangement according to FIG. 5 is understood by those skilled in the art.

In operation of the electric drive axle 10, 110, 210, the electric motor-generator 12, 112, 212 drives the output shaft 22, 122, 222 that drives the bevel gear 24, 124, 224. The bevel gear 24, 124, 224 drives the bevel pinion gear 26, 126, 226 that drives the planetary gear set 14, 114, 214. When is it desired to operate the electric drive axle 10, 110, 210 in a first mode of operation or first gear ratio, the first clutch 50, 150, 250 is engaged to selectively ground a portion of the planetary gear set 14, 114, 214.

To operate the electric drive axle 10, 110, 210 in a second mode of operation or a second gear ratio, the first clutch 50, 150, 250 is not engaged and the direct drive mode is achieved. To operate the electric drive axle 210 in a third mode of operation or third gear ratio, the second clutch 251 is engaged to ground a portion of the planetary gear set 250. The clutches 50, 150250 are in communication with a control assembly (not shown). The clutches 50, 150, 250 may have a separate control assemblies and/or can be in communication with all other vehicle controllers through a SVC. Typically, a separate supervisory controller is required for HEV/FCEV/EV systems.

The torque is transmitted from the planetary gear set 14, 114, 214 to the differential unit 36, 136, 236 and to the wheel assemblies 44, 144, 244, 46, 146, 246.

The clutches 50, 150, 250, 251 require a driveline torque interruption from the motor-generator 12, 112, 212 and a synchronous speed match from the motor-generator 12, 112, 212 to allow for engagement of the desired mode of operation or planetary gear ratio. This can be accomplished using vehicle sensors (not shown) to send signals to an electric control unit (ECU) (not shown) which controls a pneumatic or electric shift mechanism or actuator included in a controller or a SVC. The ECU can use an algorithm which incorporates motor speed, vehicle speed, grade, gross vehicle weight, acceleration, motor efficiency map, shift mechanism position and other data to determine the optimum motor speed and torque output and determine the required planetary ratio and, thereby, engage clutches 50, 150, 250, 251 respectively to achieve the desired torque output.

The motor-generator 12, 112, 212, planetary gear set 14, 114, 214 and differential unit 16, 116, 216 are integrated into an electric drive axle 10, 110, 210 which is positioned in the axle center section of a motor vehicle, thereby requiring a minimal package envelope which can be easily adapted to fit existing vehicle chasses and system.

The motor-generator 12, 112, 212 additionally provides electrical energy during regenerative braking. When the motor-generator 12, 112, 212 retards portions of the electric drive axle 10, 110, 210, electric energy is generated within the motor-generator 12, 112, 212. The electrical energy provided during regenerative braking can be utilized to charge a battery (not shown) connected to the motor-generator 12, 112, 212 through a controller (not shown).

The electric drive axles 10, 110, 210 can be used in front wheel drive and rear wheel drive vehicles. While not shown, it is understood that the electric axles 10, 110, 210 may be operated with an unpowered tag or pusher axle to form a multi-axle driveline.

The drive axles 10, 110, 210 disclosed herein are applicable to HEV, EV and Fuel Cell Hybrid systems. It should be understood that electric or hybrid electric vehicles incorporating embodiments of the electric drive axles 10, 110, 210 disclosed herein are capable of including a number of other powertrain components, such as, but not limited to, high-voltage battery pack with a battery management system or ultracapacitor, on-board charger, DC-DC converters, a variety of sensors, actuators, and controllers, among others.

In accordance with the provisions of the patent statutes, the present disclosure has been described in what is considered to represent its preferred embodiments, however, it should be noted that the embodiments can be practiced otherwise than as specifically illustrated and described without departing from its scope or spirit.

The invention claimed is:

1. An electric drive axle for a motor vehicle, comprising:
   an axle housing;
   an electric motor having an output shaft directly driven by a bevel pinion gear coupled thereto;
   a fixed ratio planetary gear arrangement including a sun gear, a ring gear, and a carrier connecting the sun gear and the ring gear;
   a differential unit including a differential gear arrangement housed within a differential case;
   a first clutch selectively operable to connect the sun gear to a first stationary member of the electric drive axle, wherein the electric drive axle is configured to operate in a first gear ratio when the first clutch is engaged; and
   a second clutch selectively operable to connect the sun gear to a second stationary member of the electric drive axle, wherein the electric drive axle is configured to operate in a second gear ratio when the second clutch is engaged,
   wherein the ring gear is drivingly connected to the bevel pinion gear,
   wherein the differential gear arrangement comprises a pair of pinion gears and side gears supported in the differential case, and
   wherein the carrier is in driving engagement with the differential case.

2. The electric drive axle of claim 1, wherein the pinion gears are rotatably supported on a pinion shaft secured to the differential case.

3. The electric drive axle of claim 1, wherein the differential unit is drivingly engaged with two axle half shafts and the electric motor is positioned transversely to the axle half shafts.

4. The electric drive axle of claim 1, wherein the planetary gear arrangement is a reducing planetary gear set.

5. The electric drive axle of claim 1, wherein the first stationary member is positioned between the planetary gear arrangement and a pair of axle shafts connected to the differential gear arrangement.

6. The electric drive axle of claim 1, wherein the first stationary member is the axle housing.

7. The electric drive axle of claim 1, wherein the first stationary member is positioned between the planetary gear arrangement and a pair of axle shafts connected to the differential gear arrangement.

8. A method of driving an electric drive axle for a motor vehicle having a fixed ratio planetary gear arrangement, comprising:
   driving a bevel pinion gear via an output shaft of an electric motor;
   driving the planetary gear arrangement via the bevel pinion gear, wherein the planetary gear arrangement comprises a sun gear, a ring gear, and a carrier connecting the sun gear and the ring gear;
   during a first mode, selectively grounding a portion of the planetary gear arrangement via a first clutch;
   during a second mode, employing a direct drive mode, wherein the first clutch is not engaged; and
   during a third mode, a second clutch is engaged to ground a portion of the planetary gear arrangement,
   wherein the sun gear is drivingly connected to the bevel pinion gear, and
   wherein the carrier is in driving engagement with a differential case housing a differential gear arrangement.

9. The method of claim 8, wherein the first clutch selectively connects the ring gear to a stationary member of the electric drive axle.

10. The method of claim 8, wherein the electric motor is coupled to an axle housing of the electric drive axle.

11. The method of claim 8, further comprising a differential unit drivingly engaged with two axle half shafts and wherein the electric motor is positioned transversely to the axle half shafts.

12. The method of claim 8, wherein the planetary gear arrangement is a reducing planetary gear arrangement.

13. The method of claim 8, wherein the drive axle is in a first gear ratio when the first clutch is engaged and a second gear ratio when the second clutch is engaged.

14. The method of claim 8, wherein during the third mode, the second clutch selectively connects the sun gear to a second stationary member of the electric drive axle.

15. A method of driving an electric drive axle for a motor vehicle having a fixed ratio planetary gear arrangement, comprising:
   driving a bevel pinion gear via an output shaft of an electric motor;
   driving the planetary gear arrangement via the bevel pinion gear, wherein the planetary gear arrangement comprises a sun gear, a ring gear, and a carrier connecting the sun gear and the ring gear;
   during a first mode, selectively grounding a portion of the planetary gear arrangement via a first clutch;
   during a second mode, employing a direct drive mode, wherein the first clutch is not engaged; and
   during a third mode, a second clutch selectively connects the sun gear to a second stationary member of the electric drive axle,
   wherein the ring gear is drivingly connected to the bevel pinion gear, and
   wherein the carrier is in driving engagement with a differential case housing a differential gear arrangement.

16. The method of claim 15, wherein the first clutch selectively connects the sun gear to a first stationary member of the electric drive axle.

17. The method of claim 15, wherein the planetary gear arrangement is a reducing planetary gear arrangement.

18. The method of claim 15, wherein the drive axle is in a first gear ratio when the first clutch is engaged and a second gear ratio when the second clutch is engaged.

* * * * *